United States Patent [19]

Stephenson, III et al.

[11] Patent Number: 5,678,073
[45] Date of Patent: Oct. 14, 1997

[54] MULTIPLE TAKING LENSES, EQUAL NUMBER FLASH BULBS, CAMERA WITH FLASH-LENS SEQUENCING TO REDUCE RED-EYE

[75] Inventors: Stanley Ward Stephenson, III, Spencerport; Marcello David Fiscella, Fairport, both of N.Y.

[73] Assignee: Eastman Kodak Company, Rochester, N.Y.

[21] Appl. No.: 655,045

[22] Filed: May 29, 1996

[51] Int. Cl.⁶ ............................ G03B 15/03; G03B 15/02; G03B 9/70
[52] U.S. Cl. ............................................ 396/155; 396/180
[58] Field of Search ............................ 354/120, 126, 354/132, 149.11, 114; 396/155, 162, 166, 168, 175, 176, 180; 362/11, 13

[56] References Cited

U.S. PATENT DOCUMENTS

| | | | |
|---|---|---|---|
| 3,202,069 | 8/1965 | Cummins et al. | 95/36 |
| 3,443,499 | 5/1969 | Gianino | 95/18 |
| 3,504,607 | 4/1970 | Bok | 95/18 |
| 3,918,073 | 11/1975 | Henderson et al. | 354/120 |
| 4,087,849 | 5/1978 | Colville et al. | 362/13 |
| 4,556,303 | 12/1985 | Martin | 354/141 |
| 4,681,415 | 7/1987 | Beer et al. | 354/120 |
| 4,690,531 | 9/1987 | Hansen et al. | 354/149.11 |
| 4,769,660 | 9/1988 | Heinrich | 354/120 |
| 4,816,854 | 3/1989 | Tsuji et al. | 354/413 |
| 5,023,639 | 6/1991 | Ushiro et al. | 354/132 |
| 5,214,461 | 5/1993 | Sadre-Marandi | 354/118 |
| 5,264,882 | 11/1993 | Kameyama et al. | 354/125 |
| 5,424,792 | 6/1995 | Mikami | 354/120 |
| 5,444,508 | 8/1995 | Okoyama | 354/120 |

*Primary Examiner*—Safet Metjahic
*Assistant Examiner*—Christopher Mahoney
*Attorney, Agent, or Firm*—Roger A. Fields

[57] ABSTRACT

A camera has a plurality of taking lenses and an equal number of flash sources which are used in a 1:1 relationship that attempts to maximize the flash-to-lens distance in order to reduce red-eye.

7 Claims, 2 Drawing Sheets

MULTIPLE TAKING LENSES, EQUAL NUMBER FLASH BULBS, CAMERA WITH FLASH-LENS SEQUENCING TO REDUCE RED-EYE

FIELD OF THE INVENTION

The invention relates generally to the field of photography, and in particular to cameras capable of making flash exposures. More specifically, the invention relates to a camera having a plurality of taking lenses and an equal number of flash sources which are used in a 1:1 relationship that attempts to maximize the flash-to-lens distance in order to reduce red-eye.

BACKGROUND OF THE INVENTION

It is typical for cameras to be used with a multiple flash bulb unit. The desire to make cameras relatively small, however, has tended to reduce the separation between the flash bulbs and the camera's taking lens to a few inches. Consequently, there is a tendency for an undesirable effect commonly known as "red-eye" to occur.

When using color print film and a multiple flash bulb unit, red-eye is typified by the pupils in the eyes of a person being photographed coming out red-tinted on a color print made from the exposed film. This occurs when the flash illumination enters the pupils in ones eyes, and illuminates the retinas in ones eyes at regions approximately in line with the camera's taking lens. The illuminated red coloring of the retinas causes the pupils to appear red-tinted, and is reflected into the taking lens.

Red-eye may be substantially avoided by increasing the separation between the flash unit and the camera's taking lens. As a result, the light emitted from the flash unit will reach the eyes of a person being photographed at too great an angle to be reflected by the retinas into the taking lens.

One way of increasing the separation between the flash unit and the camera's taking lens is to use a multiple flash bulb array commonly known as a "flip-flash". The flip-flash is evenly divided into two similar-number groups of successively arranged flash bulbs, one group being located vertically above the other group when the flip-flash is connected to a flash socket on the camera. Only the group farthest from the taking lens of the camera is used, and the flash bulbs in that group are ignited in their successive order beginning with the top-most bulb. When each of the flash bulbs in that group has been ignited, the flap-flash is disconnected from the flash socket, inverted, and then re-connected to the flash socket. As a result, the unused bulbs are always farthest from the taking lens. However, the photographer must remember to invert the flip-flash when each of the flash bulbs in the group farthest from the camera's taking lens has been ignited. A failure to do this can result in underexposed pictures.

SUMMARY OF THE INVENTION

According to one aspect of the invention, a camera intended to be used with a plurality of flash sources arranged as a group in a successive order, comprises:

a plurality of taking lenses equal in number to the group of flash sources, and arranged as a group in a successive order separate from the group of flash sources; and control means for using only one of the group of taking lenses and the group of flash sources in their successive order and, simultaneously, for using the other one of the group of taking lenses and the group of flash sources in a predetermined non-successive order to attempt to maximize the flash-to-lens distance to reduce red-eye.

According to another aspect of the invention, a method of reducing red-eye for a camera of the type having a plurality of taking lenses arranged as a group in a successive order, an equal number of flash sources arranged as a group in a successive order separate from the group of taking lenses, and operable means for using the taking lenses and the flash sources in a 1:1 relationship, comprises the steps:

using only one of the group of taking lenses and the group of flash sources in their successive order and, simultaneously, using the other one of the group of taking lenses and the group of flash sources in a predetermined non-successive order to attempt to maximize the flash-to-lens distance to reduce red-eye.

DETAILED DESCRIPTION OF THE INVENTION

The invention is disclosed as being embodied preferably in a camera with a multiple flash bulb array. Because the features of a camera with a multiple flash bulb array are generally known, the description which follows is directed in particular only to those elements forming part of or cooperating directly with the disclosed embodiment. It is to be understood, however, that other elements may take various forms known to a person of ordinary skill in the art.

Figure 1:
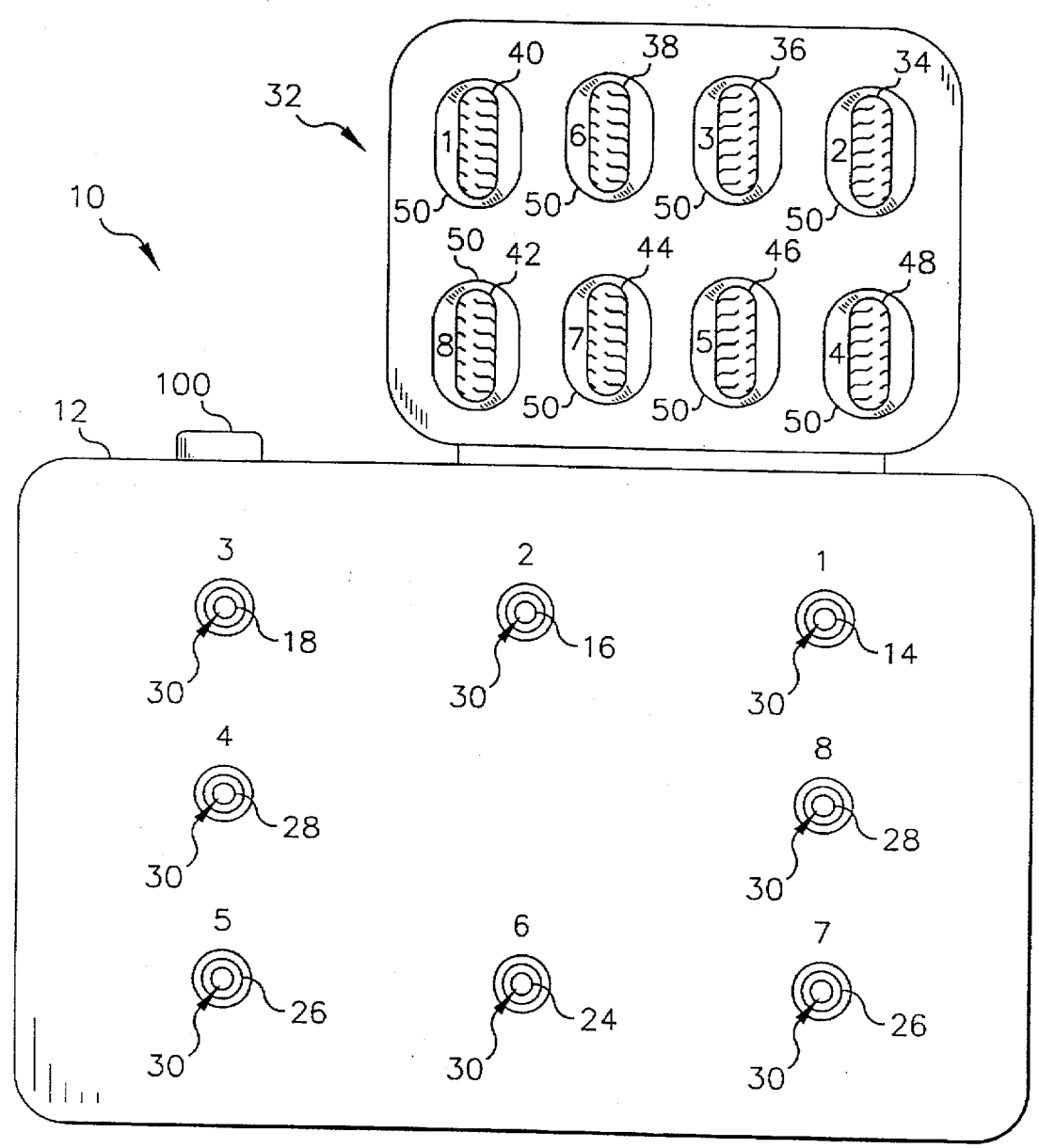
FIG. 1 is a front elevation view of a camera with a multiple flash bulb array, which is a preferred embodiment of the invention.

Referring now to the drawings, FIG. 1 shows a camera 10 having a housing 12 in which eight identical taking lenses 14, 16, 18, 20, 22, 24, 26 and 28 are positioned at respective openings 30 in the housing 12. The taking lenses 14–28 are arranged as a group in a successive order, and are to be used in that order to make exposures on a stationary rectangular film sheet (not shown) in the housing 12. Numbers "1", "2", "3", "4", "5", "6", "7" and "8" are printed on the outside of the housing 12 proximate the respective openings 30 to indicate the successive order in which the taking lenses 14–28 are to be used.

A flip-up flash unit 32 pivotally connected to the housing 12 has eight identical flash bulbs 34, 36, 38, 40, 42, 44, 46 and 48 in front of individual flash reflectors 50. The flash bulbs 32–48 are arranged as a group in a successive order. However, unlike the taking lenses 14–28, the flash bulbs 32–48 are to be used in a non-successive order. The non-successive order in which the flash bulbs 32–48 are to be used is predetermined to attempt to maximize the flash-to-lens distance for each exposure on the rectangular film sheet to reduce red-eye. Numbers "1", "2", "3", "4", "5", "6", "7" and "8" are printed on the respective reflectors 22 to indicate the non-successive order in which the flash bulbs 34–48 are to be used. Thus, in sequence, the taking lens 14 and the flash bulb 40 are to be used in combination, the taking lens 16 and the flash bulb 34 are to be used in combination, the taking lens 18 and the flash bulb 36 are to be used in combination, the taking lens 20 and the flash bulb 48 are to be used in combination, the taking lens 22 and the flash bulb 46 are to be used in combination, the taking lens 24 and the flash bulb 38 are to be used in combination, the taking lens 26 and the flash bulb 44 are to be used in combination, and the taking lens 28 and the flash bulb 42 are to be used in combination.

Figure 2:
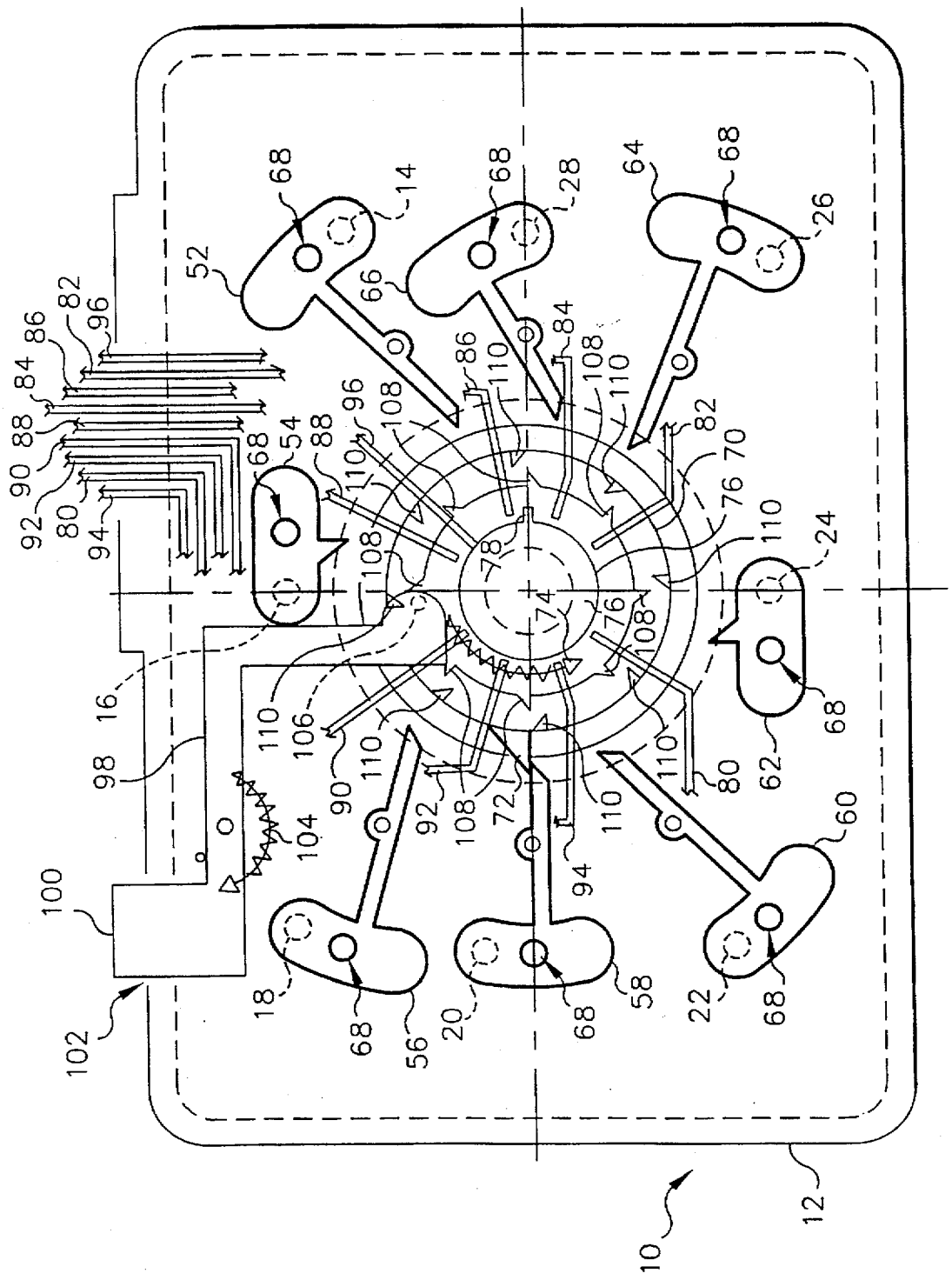
FIG. 2 is a front elevation view of control means for operating the camera.

As shown in FIG. 2, a plurality of shutter blades 52, 54, 56, 58, 60, 62, 64 and 66 originally covering the respective lenses 14-28 are supported for individual unidirectional movement to first uncover and then quickly re-cover the respective lenses to make exposures on the rectangular film sheet. The shutter blades 52-66 each have an opening 68 to momentarily uncover the respective lenses 14-28.

A triggering wheel 70 has a blade actuator tooth 72 for moving the respective blades 52-66 to uncover and re-cover the respective lenses 14-28 in the successive order of the taking lenses, when the triggering wheel is incrementally rotated counter-clockwise in FIG. 2. A torsion spring 74 incrementally rotates the triggering wheel 70 clockwise in FIG. 2. A centered conductive disk 76 on the triggering wheel 70 has an integral peripheral extension 78 for successively contacting individual conductive leads 80, 82, 84, 86, 88, 90, 92 and 94 to the respective flash bulbs 40, 34, 36, 48, 46, 38, 44 and 42 to ignite the flash bulbs in the predetermined non-successive order as the respective blades 52-66 are moved to uncover and recover the respective lenses 14-28. A common lead 96 has one end in continuous brushing contact with the conductive disk 76 and another end connected to a battery in the flash unit 32.

A manually operable release 98 has a button portion 100 protruding through an opening 102 in the housing 12. When the button portion 100 is manually depressed, the release 98 is pivoted counter-clockwise in FIG. 3 contrary to the urging of a return spring 104, to remove a protuberance 106 of the release from engagement with any one of eight retention teeth 108 on the triggering wheel 70. This allows the torsion spring 74 to rotate the triggering wheel 70 clockwise in FIG. 3 until the protuberance 106 engages any one of eight stop teeth 110 on the triggering wheel 70. Thus, the triggering wheel 70 is rotated a single increment each time the button portion 100 is manually depressed to use only one of the taking lenses 14-28 in their successive order and, simultaneously, to use only one of the flash bulbs 34-48 in the predetermined non-successive order.

The invention has been described with reference to a preferred embodiment. However, it will be appreciated that variations and modifications can be effected by a person of ordinary skill in the art without departing from the scope of the invention. For example, the flash unit 32 can be either a permanent part of the camera 10 or it can be replaceable in a known manner.

PARTS LIST 10. camera
12. housing
14. taking lens
16. taking lens
18. taking lens
20. taking lens
22. taking lens
24. taking lens
26. taking lens
28. taking lens
30. openings
32. flip-up flash unit
34. flash bulb
36. flash bulb
38. flash bulb
40. flash bulb
42. flash bulb
44. flash bulb
46. flash bulb
48. flash bulb
50. flash reflector
52. shutter blade
54. shutter blade
56. shutter blade
58. shutter blade
60. shutter blade
62. shutter blade
64. shutter blade
66. shutter blade
68. opening
70. triggering wheel
72. blade actuator tooth
74. torsion spring
76. conductive disk
78. peripheral extension
80. conductive lead
82. conductive lead
84. conductive lead
86. conductive lead
88. conductive lead
90. conductive lead
92. conductive lead
94. conductive lead
96. common lead
98. manually operable release
100. button portion
102. opening
104. return spring
106. protuberance
108. retention teeth
110. stop teeth

We claim:

1. A camera intended to be used with a plurality of flash sources arranged as a group in a successive order of the flash sources, comprising:

a plurality of taking lenses equal in number to the group of flash sources, and arranged as a group in a successive order of said taking lenses separate from the group of flash sources; and control means for using only one of said group of taking lenses and the group of flash sources in the successive order of whichever of the taking lenses or the flash sources is in the one used group and, simultaneously, for using the other one of said group of taking lenses and the group of flash sources in a predetermined non-successive order different than the successive order of whichever of the taking lenses or the flash sources is in the other used group, to attempt to maximize the flash-to-lens distance to reduce red-eye, with said taking lenses and the flash sources each being used only one at a time.

2. A camera as recited in claim 1, wherein said control means includes shutter means for uncovering and recovering respective ones of said taking lenses in their successive order and conductive means for igniting respective ones of the flash sources in the predetermined non-successive order.

3. A camera comprising:

a plurality of taking lenses arranged as a group in a successive order of said taking lenses;

an equal number of flash sources arranged as a group in a successive order of said flash sources separate from said group of taking lenses; and control means for using only one of said group of taking lenses and said group of flash sources in the successive order of whichever of the taking lenses or the flash sources is in the one used group and, simultaneously, for using the other one of the group of taking lenses and the group of flash sources in a predetermined non-successive order different than the successive order of whichever of the taking lenses or the flash sources is in the other used group to attempt to maximize the flash-to-lens distance to reduce red-eye eye, with said taking lenses and said flash sources each being used only one at a time.

4. A camera as recited in claim 3, wherein said control means includes triggering means centrally supported substantially within said group of taking lenses for rotation successive increments to use only one of the group of taking lenses and the group of flash sources in the successive order of whichever of the taking lenses or the flash sources is in the one used group and, simultaneously, to use the other one of the group of taking lenses and the group of flash sources in the predetermined non-successive order.

5. A camera as recited in claim 4, further comprising spring means biasing said triggering means for rotation successive increments, wherein said triggering means includes a plurality of stop means and a plurality of retention means each of which is equal in number to the equal number of said taking lenses and flash sources, and further comprising release means manually operable to disengage respective ones of said retention means and engage respective ones of said stop means to permit said spring means to rotate said triggering means successive increments.

6. A method of reducing red-eye for a camera of the type having a plurality of taking lenses arranged as a group in a successive order of the taking lenses, an equal number of flash sources arranged as a group in a successive order of the flash sources separate from the group of taking lenses, and operable means for using the respective taking lenses and the respective flash sources one at a time, comprises the steps:

using only one of the group of taking lenses and the group of flash sources in the successive order of whichever of the taking lenses or the flash sources is in the one used group and, simultaneously, using the other one of the group of taking lenses and the group of flash sources in a predetermined non-successive order different than the successive order of whichever of the taking lenses or the flash sources is in the other used group to attempt to maximize the flash-to-lens distance to reduce red-eye with each one of the taking lenses and the flash sources being used only once.

7. A camera intended to be used with a plurality of flash sources arranged as a group in a successive order of the flash sources, comprising:

a plurality of taking lenses equal to the group of flash sources, and arranged as a group in a successive order of said taking lenses;

control means for using said group of taking lenses in the successive order of said taking lenses and, simultaneously, for using said group of flash sources in a predetermined non-successive order different than the successive order of the flash sources to attempt to maximize the flash-to-lens distance to reduce red-eye, with said taking lenses and the flash sources each being used only one at a time, and including a plurality of separate shutter blades movable unidirectionally independent of each other for uncovering and recovering the respective taking lenses one at a time in their successive order.

* * * * *